UNITED STATES PATENT OFFICE.

WILHELM GAUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

METHOD OF ABSORBING CARBON MONOXID.

1,196,101.   Specification of Letters Patent.   Patented Aug. 29, 1916.

No Drawing.   Application filed October 21, 1914.   Serial No. 867,716.

*To all whom it may concern:*

Be it known that I, WILHELM GAUS, citizen of the German Empire, residing at Ludwigshafen-on-the-Rhine, Germany, have invented new and useful Improvements in Methods of Absorbing Carbon Monoxid, of which the following is a specification.

It is known that carbon monoxid can be absorbed by means of cuprous chlorid solutions and that this absorption proceeds more rapidly and completely if the treatment be carried out under increased pressure. Up to the present, however, this process could not be used on a large scale while employing iron or steel apparatus, since the solutions employed, including those containing ammonia, (see Treadwell, *Quantit. Analyse,* 6th edition 1913, page 652), very soon attacked the iron or steel apparatus such as vessels, pipes and pumps depositing copper on them and weakening them.

I have found that the absorption of carbon monoxid by means of cuprous chlorid solutions can be carried out advantageously on a large scale, that is to say, very rapidly and without damaging any iron apparatus employed, if ammoniacal solutions of cuprous chlorid be employed, containing in each liter at least and preferably considerably above sixty grams of ammonia. In this application I employ the word iron to designate both ordinary iron and steel. The ammonia may be added either in the free form, or in the form of carbonate. The quantity of ammonia which gives the best result may vary according to the conditions under which the process is being carried out, for instance, it may vary with the quantity of cuprous chlorid employed and with the sort of iron used for the apparatus.

The process of the present invention is of particular value when the absorption is being carried out under increased pressure, because then materials such as earthenware and lead cannot be used for the vessels and it is necessary to avoid injurious action on, and weakening of the iron vessels which have to be employed.

In carrying out the operation, the gas mixture containing carbon monoxid can be brought into contact with the solution, and then the carbon monoxid which has been absorbed can be removed by means of reduced pressure, these operations taking place alternately and at the same temperature, for instance, the ordinary temperature of the air. If the absorption by and the subsequent removing of a body of liquid be carried out in the same vessel, two such vessels each containing absorption liquid, can be used for continuous working, in either one or other of which the absorption is carried out, while in the other the liquid is exposed to reduced pressure in order to remove the carbon monoxid. Or the absorption liquid can be circulated continuously through an absorption space (which is maintained under pressure if the absorption is to be carried out under a higher pressure than that of the atmosphere) and then through a second space under lower pressure, or under vacuum, so that the carbon monoxid is given up again from the solution. Any ammonia which is removed from the absorption liquid during this second operation can be replaced in any suitable manner before the solution is again employed for the absorption stage, but of course before being thus employed, the solution will have the aforesaid minimum concentration as regards ammonia.

The following example will serve to illustrate further how this invention can be carried out, but the invention, however, is not confined to this example. The parts are by weight.

Example: Prepare a solution from two hundred parts of cuprous chlorid, two hundred and fifty parts of ammonium chlorid and five hundred parts of twenty-five per cent. ammonia solution and five hundred parts of water. The absorption can be carried out in steel apparatus without the vessels being sensibly attacked and, if desired, at the ordinary pressure, but preferably under increased pressure, and if a very high pressure, for instance, a pressure above that of one hundred atmospheres be employed, a rapid and complete removal of even the smallest quantities of carbon monoxid from the gases can be effected. The process of the present invention is of especial value for the removal of carbon monoxid from hydrogen containing small quantities of this impurity.

The ammonia can be employed in whole or in part in the form of ammonium carbonate, and also in those cases in which free ammonia is employed, either wholly or in the main part, the gas mixture need not be previously freed from carbon dioxid.

If the solution, after being used for some time, should, owing to the action of oxygen, contain any considerable quantity of copper in the cupric state, the said solution can be allowed to stand, before driving out the carbon monoxid, until the reducing action of the dissolved carbon monoxid has brought the copper again into the cuprous condition.

Now what I claim is:—

1. The process of absorbing carbon monoxid from gases containing it, which consists in treating the said gases in iron apparatus with a solution of cuprous chlorid containing such a proportion of ammonia that the iron of the apparatus remains practically unattacked.

2. The process of absorbing carbon monoxid from gases containing it, which consists in treating the said gases under increased pressure in iron apparatus with a solution of cuprous chlorid containing such a proportion of ammonia that the iron of the apparatus remains practically unattacked.

3. The process of absorbing carbon monoxid from gases containing it, which consists in treating the gases in iron apparatus with a solution of cuprous chlorid containing at least 60 grams of ammonia in each liter.

4. The process of absorbing carbon monoxid from gases containing it, which consists in treating the gases under increased pressure in iron apparatus with a solution of cuprous chlorid containing at least 60 grams of ammonia in each liter.

In testimony whereof I have hereunto set my hand in the presence of two subscribing witnesses.

Dr. W. GAUS.

Witnesses:
  HANS WINKLER,
  H. MERLE COCHRAN.